A. H. EMERSON.
LENS TESTING INSTRUMENT.
APPLICATION FILED MAY 31, 1913.
1,241,612.
Patented Oct. 2, 1917.
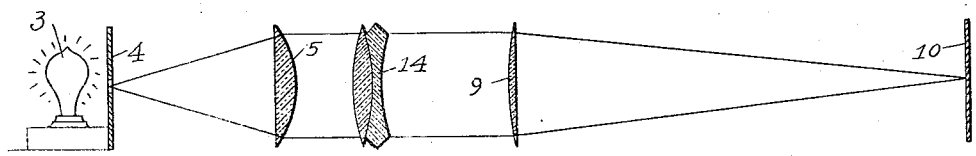
FIG. I
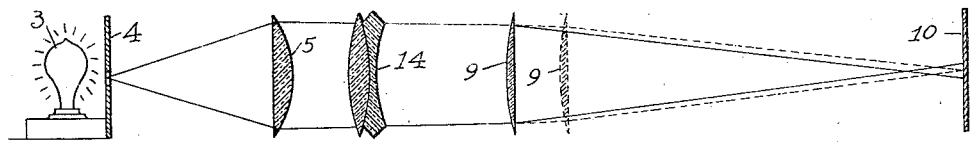
FIG. II
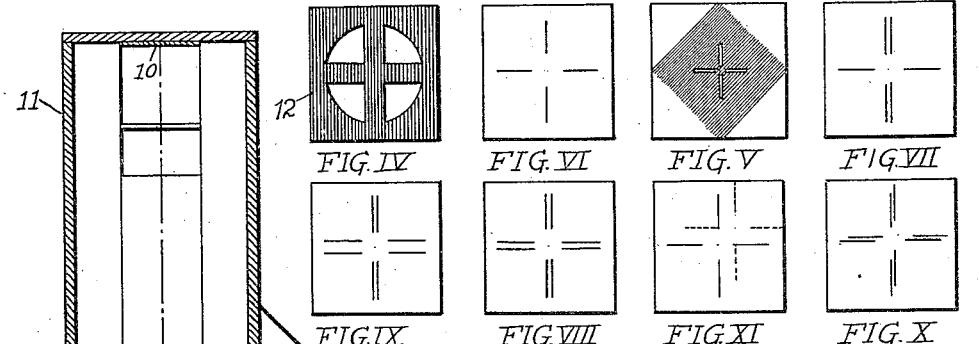
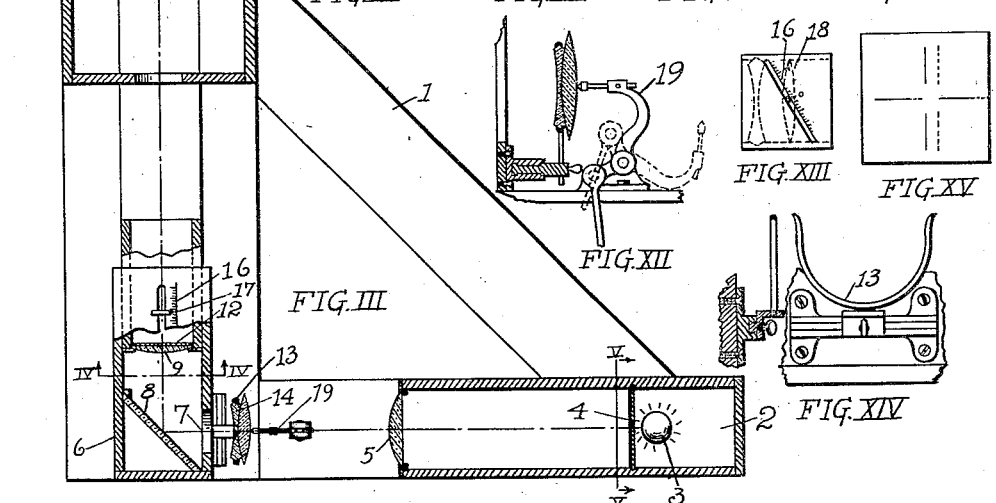
WITNESSES:
Joseph J. Demers
Florence E. Coderre
INVENTOR
ALFRED H. EMERSON
By
H. H. Stytt, H. K. Parsons
ATTORNEYS

UNITED STATES PATENT OFFICE.

ALFRED H. EMERSON, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

LENS-TESTING INSTRUMENT.

1,241,612.   Specification of Letters Patent.   Patented Oct. 2, 1917.

Application filed May 31, 1913. Serial No. 771,021.

*To all whom it may concern:*

Be it known that I, ALFRED H. EMERSON, a subject of the King of England, residing at Southbridge, in the county of Worcester and State of Massachusetts, have invented certain new and useful Improvements in Lens-Testing Instruments, of which the following is a specification.

My invention relates to improvements in lens testing instruments and has particular reference to means for determining the error in spectacle, eyeglass or similar lenses of any indicated power.

The primary object of my invention is the provision of a lens testing instrument which will indicate any error in power of a lens.

It is well known that spectacle, eyeglass and similar lenses are regularly sold to neutralize with trial case lenses of the opposite indicated power and one of the leading objects of my invention is to provide an instrument making use of this principle of neutralization which shall indicate whether the lenses are correctly neutralized or not.

A further object of my invention is the provision of an instrument which in addition to indicating the neutralization or lack of neutralization of the lenses, will also serve to measure the residual power, if any, and thus indicate the variation.

A further object of my invention is the provision of an instrument in which the lens may be tested against any standard and will serve to measure and denote the variation, if any, between the lens being tested and the said standard, such standard in ordinary use being either a neutralizing set or trial case lens.

A further object of my invention is to provide a means of locating the optical center of the lens or the amount of prism in a lens or the power of any plane prism or compound sphere and cylinder and prism,— in other words, any lens which is prismatic may be correctly measured by this system; or for locating the principal meridian of compound lenses. By compound lenses we mean lenses of any form which have cylindrical effect as well as spherical.

A further object is to provide an instrument which will measure the error in any lens within the range of a trial case, the error only being indicated by the scale, irrespective of the power of the lens being tested.

A further object is to provide a true method of neutralizing so that one can disregard the magnification or telescopic eff ct present in thick lenses.

Another object of my invention is the provision of an instrument as above set forth which shall have a practically unlimited range of use in testing both high and low powers of positive and negative lenses and which shall be extremely compact in form and convenient for everyday use.

Another object of my invention is the provision of an instrument, in which the location of the various parts may be varied as desired to permit of alteration of the form of the instrument without altering the relative action of the parts.

Other objects and advantages of my improved instrument should be readily apparent by reference to the following specification, taken in conjunction with the accompanying drawings, forming a part thereof, and it will be understood that I am to make any modifications in the specified details of construction shown and described within the scope of the pending claims without departing from or exceeding the spirit of my invention.

Figure I represents a diagrammatic view, illustrating the use of my instrument, the parts being arranged in alinement with each other.

Fig. II represents a similar diagrammatic view, in which the lens being tested does not exactly neutralize with the lens of opposite known power, one form of the adjustment of the system necessary to compensate for this lack of neutralization being indicated in dotted lines.

Fig. III represents a plan view, partially in section, of a convenient form of my instrument in which means are employed for changing the path of the light rays in the instrument.

Fig. IV represents a sectional view on the line IV—IV of Fig. III.

Fig. V represents a similar view on the line V—V of Fig. III.

Fig. VI represents a view of the image cast on the image screen when the lens being tested is correct in power.

Fig. VII represents a view of the image when the lens has error in the vertical meridian only.

Fig. VIII is a similar view when the error is equal in all meridians.

Fig. IX represents a similar view when the error is unequal in the two principal meridians.

Fig. X is a similar view when the axis of a compound lens is incorrect.

Fig. XI represents a similar view, the dotted lines showing the displacement due to prismatic effect.

Fig. XII represents a fragmentary view of my instrument showing a marking attachment used in conjunction therewith.

Fig. XIII represents a view illustrating a device for measuring the compensation attained by relative adjustment of two lenses of opposite natures, as a means of measuring the error in the lens being tested.

Fig. XIV represents a view of a modified construction of holder for use in detecting error by movement.

Fig. XV represents a view of the normal image, the image produced in case of movement being indicated by dotted lines.

In the drawings, of which similar characters of reference are employed to denote corresponding parts throughout the several views, the numeral 1 designates the frame of my instrument which may be of any desired form.

In Fig. III I have illustrated the same as laid out in a right-angle, this form placing the lens to be tested and master lens close to the operator and, at the same time, causing the image to be directly in front so that it may be readily viewed without the necessity of change of position by the operator. Mounted on the base 1, as illustrated in Fig. III, is the casing or sheath 2, inclosing the projection portion of my instrument which serves to produce or project parallel rays. To accomplish this result I employ a suitable source of illumination 3, having disposed in front thereof the object screen 4, which is disposed at the principal focus of the collimating lens 5 at the inner end of the casing 2.

In that form of my invention here illustrated, I have made the object in the form of an illuminated cross, as shown in Fig. V, but it will be understood that this form may be varied as desired. It will be readily understood by those conversant with the optical art that the casing 2 and parts inclosed thereby altogether form a usual construction of collimator and that I do not wish to be limited to the specified details of construction here described but may, with equal facility, employ any other well known means for producing the parallel rays without varying the spirit or operation of my invention, the main idea being that of having parallel rays incident upon the lens being tested.

Mounted at the angle of my instrument, as shown in Fig. III, is a second casing 6, having an aperture 7 at one side thereof, to receive the parallel rays, and containing a reflector 8 which may be in the form of a mirror or right-angled prism, this reflector serving to divert the parallel rays entering through the aperture 7 and causing them to pass in parallel relation longitudinally of the casing 6. Mounted within the casing 6 is a converging lens 9, while disposed in advance thereof, at the principal focus of said lens 9, is a screen 10 for receiving the image of the object 4. This screen is preferably inclosed by a darkened hood 11, in order that the luminous image or images on the screen can be more easily seen in ordinary daylight.

When my system as above described is in exact and correct adjustment, the image on the screen 10 is clear and sharply defined, while if the system is at all out of focus, the image will appear on the screen but will be more or less blurred according to the amount of error in the system. To enable persons with but slight optical knowledge to readily perceive whether the system is in exact focus or not, I preferably place adjacent the converging lens 9, a suitable diaphragm 12, which I have illustrated as a cross, although it will be understood that other forms may be employed as desired, the arms of the cross being disposed in parallel relation to those of the object 4. With this diaphragm in position, if the instrument is in exact focus an image such as shown in Fig. VI will appear on the screen with the lines clear and sharp, but should the same be out of focus, double lines appear.

To use my instrument for testing lenses, I place a convenient holder 13 anywhere between the collimator and the converging lens in the path of the parallel rays, and place within this holder a neutralizing lens 14 of opposite power or powers to the lens to be tested. The lens to be tested is then held in close contact with the neutralizing lens and the image of the cross upon the screen 10 observed. Should this remain single, the lens is correct. Should any of the lines appear double, it indicates that the lens has an error, which error can be measured by several methods. The preferable method for measurement of this error is that of shifting the converging lens 9 either toward or away from the screen as it may prove necessary to cause the double line to become single and sharply defined. This adjustment is preferably employed in conjunction with a scale 16 and pointer 17 traveling thereover, the scale being graduated to denote the error in the lens being tested, in suitable measurement, such as hundredths of a diopter.

While, as above stated, I preferably employ this form of adjustment inasmuch as considerable movement of the converging lens is necessary for measurement of small amounts of error in the lens, it is to be understood that I do not wish to limit myself to this particular construction since the same result may be attained by adjustment of either the object screen 4, the collimator lens 5, the screen 10, or by introducing a compensator such as shown in Fig. XIII, into the path of the parallel rays. This compensator comprises a pair of lenses of opposite but slightly differing powers, separated an amount necessary to make them neutral. Increase or decrease of this separation varies the power in the compensator until it equals the error in the lens being tested, scale 16 on the casing 18 of the compensator indicating the error. It is to be understood that in the use of my improved lens testing instrument, I do not attempt to determine the power of the lens to be tested directly, the essential point being that of employing a standard lens of known power which should neutralize the lens to be tested, my instrument being employed merely to measure the error, if any, in the lens being tested and, consequently, the same scale will denote the error in the lens irrespective of the actual power or form thereof. The error can also be measured by a suitable scale upon the image screen by which we could measure the separation between the double images, the error being proportional to the separation. Lenses having different powers in different meridians, such as combined sphere and cylinder, can also be tested by placing a neutralizing lens of opposite powers, the axis of the cylinder preferably, in the horizontal meridian in the holder 13, the lens being held in contact with this. The lens will be rotated by hand until the image appears regular. If the axis be oblique, the image will appear as in Fig. X. When the axis is placed correctly, any doubling of the horizontal line alone indicates error in the cylinder, and any doubling of the vertical line indicates error in the sphere. Fig. IX illustrates error in both sphere and cylinder unequally, the error in the cylinder being greater than in that of the sphere. Displacement of the image, as shown by the dotted lines in Fig. XI, indicates prismatic effect in the lens being tested, which can be read off on a suitable scale on the image screen. The powers of plane prisms can also be measured this way. When the lens has been correctly positioned, a suitable marking device 19, as shown in Fig. XII, may be actuated to correctly mark the lens.

I do not wish to limit myself to the detection of the error in the lens being tested by consideration of the definition of the image, but may employ my instrument to detect movement. This may be effected by arranging the holder 13 so that it might be moved a definite amount at right angles to the path of the parallel rays. The movement of the image will be proportional to the error.

Fig. XIV shows a view of a holder 13 for supporting the master lens and lens to be tested for such movement while Fig. XV illustrates in full lines the normal image and in dotted lines the movement attendant upon shifting of the two lenses.

From the foregoing description, the construction of my instrument should be readily apparent and it will be seen that I have provided a simple and extremely efficient instrument which will satisfactorily detect and measure very small errors in lenses, which employs primarily parallel rays for use in testing an unknown lens with a known lens of any standard and which serves to detect the slightest error in the lens being tested and to satisfactorily indicate the amount of such error irrespective of the indicated power of the lens and which on account of the employment of the principle of neutralization in the testing of the lens, will serve to test and measure a lens of any power for which there is a standard for comparison.

Claims:

1. In a lens testing instrument, the combination with means for projecting an image, of a converging lens and an image screen in the path of the rays, means for holding a lens to be tested intermediate the projecting means and the screen, means for approximately neutralizing the lens to be tested, and means for accurately determining the residual power of the lens.

2. In a lens testing instrument, the combination with means for projecting an image, of a converging lens and an image screen in the path of projection, means for holding a lens to be tested in said path, means for approximately neutralizing the lens to be tested, and a diaphragm adjacent the converging lens having a plurality of transparent portions and having a central opaque portion whereby a plurality of images are produced on the image screen when there is residual power in the lens after approximate neutralization thereof.

3. In a lens testing instrument, the combination with means for projecting an image, of a converging lens and an image screen in the path of projection, means for holding a lens to be tested in said path, means for approximately neutralizing the lens to be tested, a diaphragm adjacent the converging lens having a plurality of transparent portions and having a central opaque portion whereby a plurality of images are produced on the image screen when there is residual power in the lens after approximate neutralization thereof, and means for measuring said residual power.

4. In a lens testing instrument, the combination with means for projecting an image, of a converging lens and screen in the path of projection for forming the image, means for holding a lens to be tested in the path of projection, means for compensating for the power of the lens, and a diaphragm inserted in the path of projection whereby four separated images are produced on the screen on improper adjustment of the compensating means.

5. In a lens testing instrument, the combination with means for projecting the image of a cross, of a condensing lens, an image screen in the path of projection, means for holding a lens to be tested in the path of projection, means for compensating for the power of the lens to be tested, and a four hole diaphragm disposed in the path of the projection whereby the effect of a double line cross is produced in one or both meridians upon improper adjustment of the compensating means, substantially as described.

In testimony whereof I affix my signature in presence of two witnesses.

ALFRED H. EMERSON.

Witnesses:
FLORENCE E. CODERRE,
H. K. PARSONS.